United States Patent [19]

Blomgren et al.

[11] Patent Number: 5,188,914

[45] Date of Patent: Feb. 23, 1993

[54] LOW TEMPERATURE MOLTEN COMPOSITIONS COMPRISED OF QUATERNARY ALKYL PHOSPHONIUM SALTS

[75] Inventors: George E. Blomgren, Lakewood; Steven D. Jones, North Ridgeville, both of Ohio

[73] Assignee: Eveready Battery Company, Inc., St. Louis, Mo.

[21] Appl. No.: 773,825

[22] Filed: Oct. 9, 1991

[51] Int. Cl.$^5$ .............................................. H01M 6/16
[52] U.S. Cl. ................................... 429/112; 429/198; 429/200
[58] Field of Search ............... 429/112, 198, 199, 200; 252/62.2; 204/243 R

[56] References Cited

U.S. PATENT DOCUMENTS

| | | | |
|---|---|---|---|
| 3,541,124 | 11/1970 | Owens | 252/62.2 |
| 4,122,245 | 10/1978 | Nardi et al. | 429/194 |
| 4,160,070 | 7/1979 | Margalit et al. | 429/194 |
| 4,355,086 | 10/1982 | Saathoff et al. | 429/105 |
| 4,463,071 | 7/1984 | Gifford et al. | 429/194 |
| 4,463,072 | 7/1984 | Gifford et al. | 429/194 |
| 4,482,616 | 11/1984 | Connolly et al. | 429/101 |
| 4,520,084 | 5/1985 | Tinker et al. | 429/101 |
| 4,537,843 | 8/1985 | Shishikura et al. | 429/197 |
| 4,752,544 | 6/1988 | Gregory | 429/199 X |
| 4,764,440 | 8/1988 | Jones et al. | 429/198 |
| 4,808,497 | 2/1989 | Blomgren et al. | 429/194 |
| 4,839,249 | 6/1989 | Jones et al. | 429/194 |
| 5,096,789 | 3/1992 | Melton et al. | 429/199 X |

FOREIGN PATENT DOCUMENTS 60-30065  2/1985  Japan .
2150740  7/1985  United Kingdom .

OTHER PUBLICATIONS

Wicelinski, et al., *J. Electrochemical Society* 1987, vol. 134, No. 1 pp. 262-263.
Wilkes, et al., *Journal of Inorganic Chemistry* 1982, vol. 21, pp. 1263-1264.
Wilkes, et al., *Seiler Research Laboratory Report*, FJSRL-TR-0002, 1982.
Stein et al., *Journal of American Chemical Society*, 1981, vol. 103, No. 9 pp. 2192-2198.
Byrne et al., *Tetrahedron Letters*, 1986, vol. 27, No. 11, pp. 1233-1236.

*Primary Examiner*—Stephen Kalafut
*Attorney, Agent, or Firm*—Robert W. Welsh

[57] ABSTRACT

Low temperature molten compositions are comprised of a mixture of an inorganic halide salt such as aluminium trichloride, and a quaternary alkyl phosphonium halide salt, such as tetramethylphosphonium chloride, and are useful as electrolytes in electrochemical cells.

19 Claims, No Drawings

LOW TEMPERATURE MOLTEN COMPOSITIONS COMPRISED OF QUATERNARY ALKYL PHOSPHONIUM SALTS

BACKGROUND OF THE INVENTION

This invention relates to compositions comprising alkyl phosphonium salts that are molten at low temperatures and to the use of such compositions as electrolytes in electrochemical cells.

A class of molten compositions which is of special interest in the field of electrochemical cells is the class of fused salt compositions which are molten at low temperature. These compositions can be useful as electrolytes. Such molten or fused salt compositions are mixtures of compounds which are liquid at temperatures below the individual melting points of the components. The mixtures can form molten compositions simultaneously upon contacting the components together or after heating and subsequent cooling.

One example of molten or fused salt compositions that are useful as electrolytes are the chloroaluminate salts discussed by Wilkes, J. S., et al; in *J. Inorg. Chem.*, Vol. 21, 1263-1264, 1982. To form the molten salt, alkyl imidazolium or pyridinium salts are mixed with aluminum trichloride ($AlCl_3$). Another example is the chlorogallate salts made from gallium trichloride and methylethylimidazolium chloride that are discussed in Wicelinski et al, "Low Temperature Chlorogallate Molten Salt Systems," *J. Electrochemical Soc.*, Vol. 134, 262-263, 1987. The use of the fused salts of 1-alkylpyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071; 4,463,072 and Great Britain Patent Application GB 2,150,74DA. Unfortunately, the alkylimidazolium salts are difficult to prepare, and the alkyl pyridinium salts are too easily reduced in an electrochemical cell system.

Another class of fused salt compositions are the compositions formed from a metal halide and a hydrocarbyl-saturated onium salt containing at least one aromatic group. These are disclosed in U.S. Pat. No. 4,764,440. In U.S. Pat. No. 4,839,249, low temperature molten compositions comprised of ternary alkyl sulfonium salts are disclosed. Unfortunately, the hydrocarbyl-saturated aromatic substituted onium salts have low conductivities. The sulfonium salts are difficult to prepare.

In view of the deficiencies of known compositions, other electrolyte compositions which have improved stability or conductivity or are more easily prepared are desired.

SUMMARY OF THE INVENTION

This invention is a low temperature molten composition comprising a mixture of an inorganic halide salt and a quaternary alkyl phosphonium halide salt.

In another aspect this invention is an electrochemical cell comprising an anode, a cathode, a separator and a low temperature molten electrolyte composition comprising a mixture of an inorganic halide salt and a quaternary alkyl phosphonium halide salt.

The compositions of this invention provide low temperature molten salt compositions that are useful as electrolytes in batteries, electroplating processes, electrorefining processes, and electrowinning processes.

DETAILED DESCRIPTION OF THE INVENTION

The low temperature molten compositions of this invention can be referred to as fused salt compositions or ionic aprotic solvents. By "low temperature molten" is meant that the compositions are in liquid form below about 200° C. at standard pressure. Preferably, the molten composition is in liquid form below about 60° C., and more preferably below about 23° C. at standard pressure.

The inorganic halide salts useful in this invention are those compounds that can form anions in the presence of the anion from the quaternary alkyl phosphonium halide salt. Preferred inorganic halide salts are selected from the group comprising aluminum, gallium, and indium with aluminium being most preferred. The corresponding most preferred halide is chloride and therefore, the most preferred inorganic halide salt is aluminum trichloride. This inorganic halide salt is most preferred because it is readily available and can form chloroaluminate melts containing the polynuclear ion $Al_2Cl_7^-$ in the molten salt composition. These chloroaluminate melts are especially useful in secondary electrochemical cells.

The quaternary alkyl phosphonium halide salts used in this invention have alkyl groups substituted on the phosphorus. As used herein, "alkyl" means saturated hydrocarbyl groups. Besides being substituted with four separate alkyl groups, the phosphonium cation can form one or two saturated heterocyclic ring structures wherein two or four of the alkyl groups form a portion of the heterocyclic rings with the phosphorus. Of these saturated heterocyclic cations, dimethyltetramethylenephosphonium chloride (also called dimethylbutylenephosphonium chloride) is preferred. Preferably, the alkyl groups are straight or branched chains of suitable size to result in a room temperature molten composition with the metal halides. Short chain alkyl groups are most preferred, because they form low viscosity melts of relatively high conductivity. Especially preferred are methyl and ethyl groups. The most preferred phosphonium salts are substituted completely with methyl groups, or with methyl groups and only one ethyl group.

The phosphonium cation can be represented by the formula:

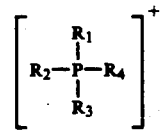

wherein $R_1$, $R_2$, $R_3$, and $R_4$ are alkyl groups, preferably short chain alkyl groups of from 1 to 4 carbons, and $R_1$ and $R_2$ or $R_1$, $R_2$, $R_3$ and $R_4$ can be members of saturated heterocyclic rings with the phosphorous. The anion of the phosphonium salts can form an anion with the metal halide. Examples of preferred anions are simple halides, such as chloride, bromide, and iodide; and complex halogen-containing ions such as $BF_4^-$, $PF_6^-$, and $AsF_6^-$. More preferably, the simple halides are employed, and of these chloride and bromide are preferred. Chloride is most preferred. An example of a preferred saturated heterocyclic phosphonium salt is dimethyltetramethylenephosphonium chloride. The most preferred quaternary alkyl phosphonium salts are tetramethylphosphonium chloride, tetraethylphosphonium chloride and tetrabutylphosphonium chloride.

The quaternary alkyl phosphonium halide salt and inorganic halide salt are employed in an amount sufficient to form a low temperature molten composition which is ionically conductive. A suitable mole ratio of quaternary alkyl phosphonium halide salt to inorganic halide salt can range from about 2:1 to about 1:2. Preferably, the composition comprises a mole ratio of phosphonium salt to inorganic halide salt of about 1:1 to about 1:2. In a highly preferred embodiment, the low temperature molten compositions of this invention consist essentially of the inorganic halide salt and the quaternary alkyl phosphonium halide salt.

Specifically, the most preferred low temperature molten compositions are mixtures consisting essentially of a molar ratio of tetramethyl phosphonium chloride to aluminum trichloride of about 1:2. Such a melt is especially useful in secondary cells because it can both plate and strip the active metal of the anode.

Typically, the inorganic halide salt and quaternary alkyl phosphonium halide salt are solids at low temperature i.e. below about 100° C. at standard pressure. For example, the melting point for tetramethylphosphonium chloride is about 396° C. Aluminum trichloride sublimes at about 178° C. at standard pressure. If a melt does not form spontaneously from contacting the inorganic halide salt with the quaternary alkyl phosphonium halide salt, the solids can be heated until a substantially homogeneous liquid forms. Upon cooling, the molten salt composition remains a liquid at low temperature, i.e. below about 200° C., preferably below about 60° C. and more preferably below about 23° C. For example, the freezing point of the aluminum trichloride and tetramethylphosphonium chloride {2:1} melt is between about $-10°$ C. to about 0° C.

Since the low temperature molten compositions of this invention are ionically conductive, they are useful as electrolytes in electrochemical cells, electrolysis, electrowinning and electrorefining processes. In such processes, an anode, a cathode, and a separator can be employed along with the electrolyte. Although the most preferred embodiment of the invention is a mixture which consists essentially of the inorganic halide salt and quaternary alkyl phosphonium halide salt, it may be desirable to employ additional compounds with the molten compositions when using such compositions as electrolytes. For example, it may be desirable to employ a solvent or solute (such as another halide salt) with the molten composition to reduce or increase the viscosity of the composition. Suitable compounds for reducing the viscosity are inert organic solvents, such as benzene. These compounds are inert relative to the molten salt and cell components. Other compounds can be employed to control the formation of substances on the electrodes or to enhance the conductivity of the molten salt composition.

In acidic melts, such as those with excess inorganic halide salt, materials which are as or less active than the metal of the inorganic halide salt on the emf scale can be employed as the anode. For example, when employing aluminum trichloride, aluminum metal or materials which are less active relative to aluminum on the emf scale can be employed as the anode. Polymers with conjugated backbones, such as polyacetylene, are also suitable. Examples of suitable active anode materials for acidic melts are Al, Mn, Zn, Cr, Fe and Cd. Preferred active anode materials are Al, Zn, and Cd. In basic melts such as those containing excess quaternary alkyl phosphonium halide, other metals such as Li, Mg or Ca can be used as anode materials, provided they are stable in the melt. The preferred anode materials for basic melts are Li and Mg. Any of these anode materials can be used for neutral melts, provided they are stable in the melt.

Examples of suitable active cathode materials are manganese dioxide, iron disulfide, polymers with conjugated backbones such as polyacetylene, polyaniline and polythiophene, $TiS_2$, $MoS_3$, $Mo_6Se_6$, $SeO_2$, $PbO_2$, $V_2O_5$ and metal chlorides such as $FeCl_2$, $NiCl_2$ and $CuCl_2$. A conductive agent such as carbon or graphite and a suitable binder for example, polytetrafluoroethylene, can be mixed with the active cathode material to form the cathode electrode. Preferred active cathode materials are those which are substantially insoluble in the electrolyte such as $MnO_2$.

Suitable separator materials are ionically permeable but yet chemically nonreactive with the cell components. Examples are glass fiber mats and porous plastics such as porous polyethylene.

The electrochemical cells can be prepared using the low temperature molten compositions of this invention as electrolytes by following conventional electrochemical cell manufacturing techniques. For example, the anode and cathode are assembled along with a suitable separator, and then the electrolyte is added to complete the cell.

The low temperature molten compositions of this invention are easily prepared and have a melting point below about 200° C. and can exhibit conductivities at room temperature of greater than about 2mS/cm, and preferably greater than about 3mS/cm. For example, the conductivity of the tetramethylphosphonium chloride and aluminum trichloride melt in a 1:2 mole ratio is about 5.0mS/cm at 25° C. The viscosities of these melts are very close to the viscosity of water. The chloroaluminate melts of this invention can have a comparable or larger electrochemical window compared to melts made from mixtures of aluminum trichloride and methylethylimidazolium chloride.

What is claimed is:

1. A molten composition comprising a mixture of an inorganic halide salt and a quaternary alkyl phosphonium halide salt, wherein the alkyl groups are short chains of from 1 to 4 carbons.

2. The composition of claim 1, wherein the alkyl groups are selected from the group consisting of methyl, ethyl and butyl groups.

3. The composition of claim 1, wherein the cation of the inorganic halide salt is a metal selected from the group comprised of aluminum, gallium, and indium.

4. The composition of claim 2, wherein the inorganic halide salt is aluminum trichloride.

5. The composition of claim 4, wherein the quaternary alkyl phosphonium halide salt is tetramethylphosphonium chloride.

6. The composition of claim 1, wherein the molar ratio of the inorganic halide salt to the quaternary alkyl phosphonium salt ranges from about 1:2 to 2:1.

7. The composition of claim 5, wherein the molar ratio of the inorganic halide salt to the quaternary alkyl phosphonium salt ranges from about 1:2 to 2:1.

8. The composition of claim 7, which consists essentially of a molar ratio of aluminum trichloride to tetramethylphosphonium chloride of 2:1.

9. An electrochemical cell comprising
   a) an anode,
   b) a cathode,
   c) a separator, and
   d) a molten electrolyte composition comprising a mixture of an inorganic halide salt and a quaternary alkyl phosphonium halide salt, wherein the alkyl groups are short chains of from 1 to 4 carbons.

10. The electrochemical cell of claim 9, wherein the alkyl groups are selected from the group consisting of methyl, ethyl and butyl groups.

11. The electrochemical cell of claim 9, wherein the inorganic halide salt is aluminum trichloride.

12. The electrochemical cell of claim 11, wherein the alkyl groups of the quaternary alkyl phosphonium halide salt are short chain alkyl groups.

13. The electrochemical cell of claim 12, wherein the quaternary alkyl phosphonium halide salt is tetramethylphosphonium chloride.

14. The electrochemical cell of claim 9, wherein the molar ratio of the inorganic halide salt to the quaternary alkyl phosphonium salt ranges from about 1:2 to 2:1.

15. The electrochemical cell of claim 13, wherein the molar ratio of the inorganic halide salt to the quaternary alkyl phosphonium salt ranges from about 1:2 to 2:1.

16. The electrochemical cell of claim 15, wherein the electrolyte composition consists essentially of a molar ratio of aluminum trichloride to tetramethylphosphonium chloride of 2:1.

17. The electrochemical cell of claim 16, wherein aluminum is employed as the anode.

18. The electrochemical cell of claim 17, wherein manganese dioxide is employed as the active cathode material.

19. The electrochemical cell of claim 9, wherein the electrolyte composition exhibits a conductivity of greater than about 2mS/cm at 25° C.

* * * * *